Nov. 17, 1953     G. H. J. BAULE     2,659,267
ROLL FILM VIEWER
Filed Oct. 7, 1950     5 Sheets-Sheet 1
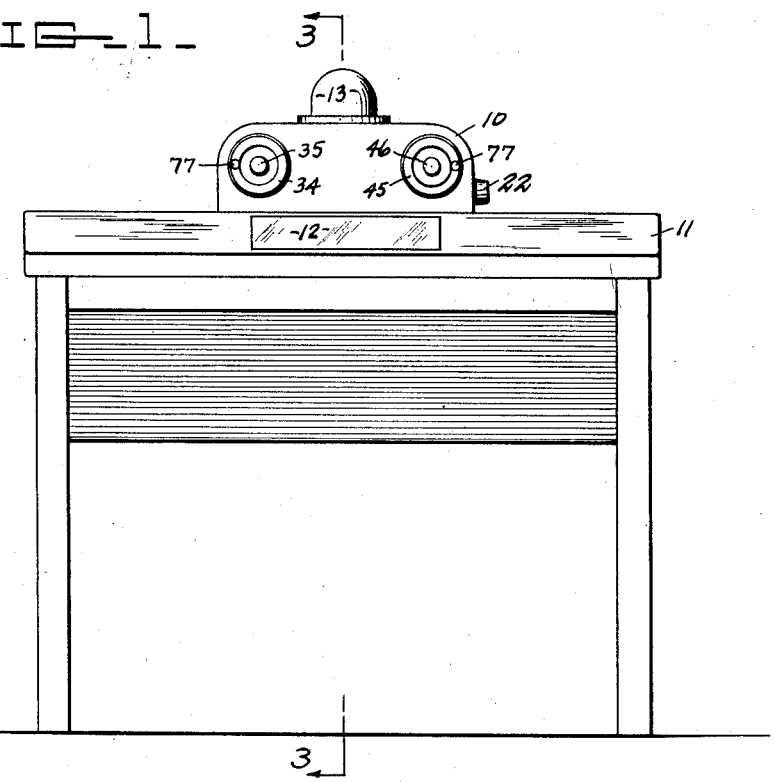
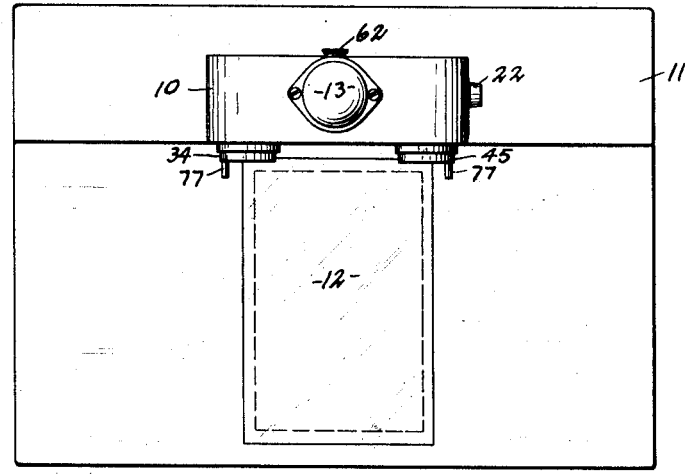
INVENTOR:
Gerhard H. J. Baule,
BY
ATTORNEYS.

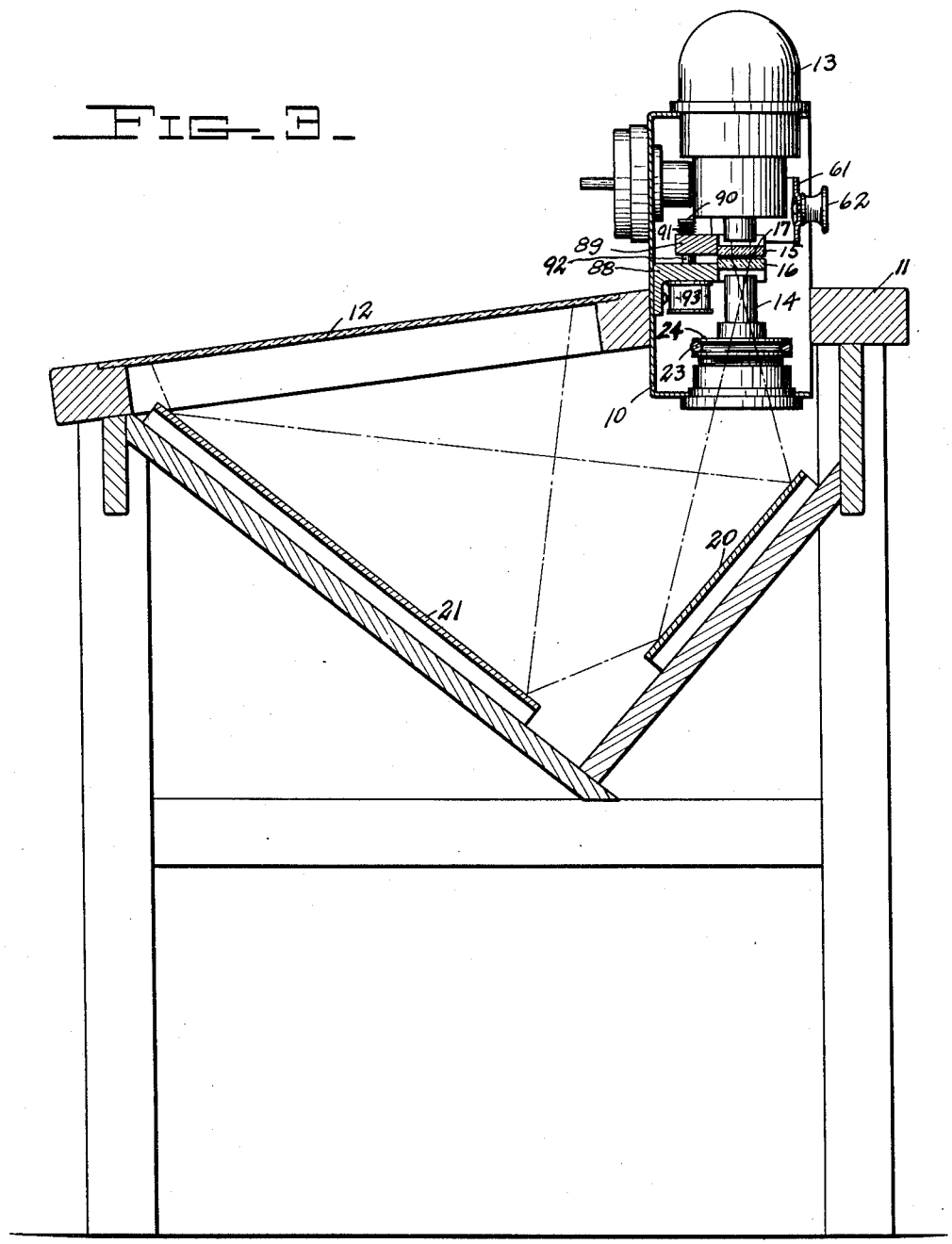

Nov. 17, 1953 G. H. J. BAULE 2,659,267
ROLL FILM VIEWER
Filed Oct. 7, 1950 5 Sheets-Sheet 3

INVENTOR:
Gerhard H. J. Baule,
BY
Bodell & Thompson
ATTORNEYS.

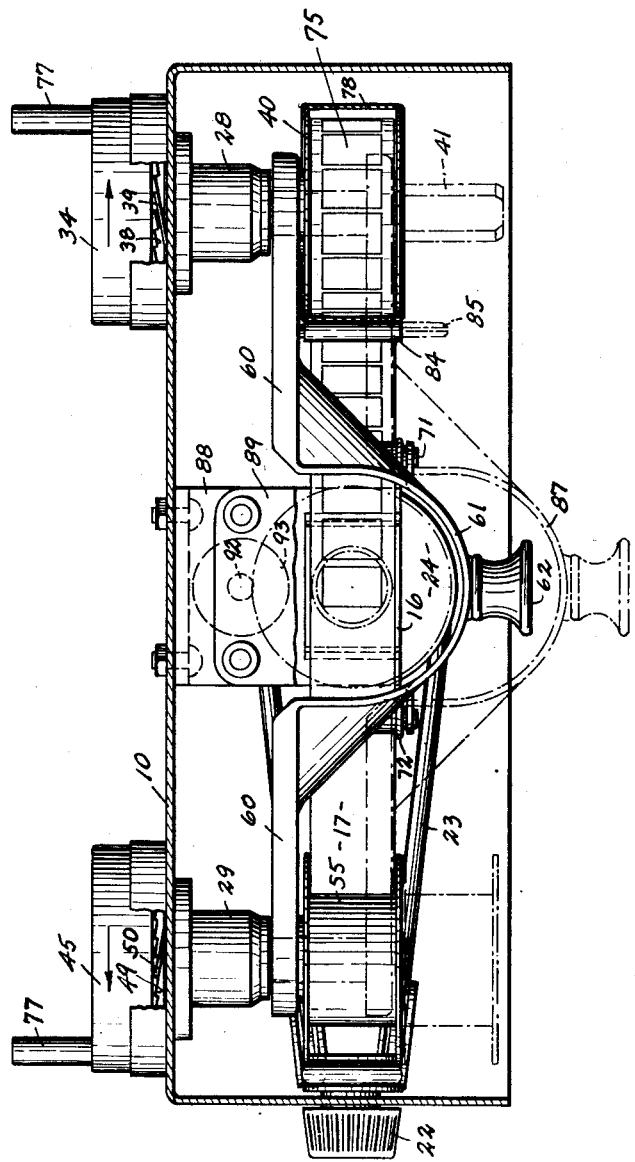

Nov. 17, 1953  G. H. J. BAULE  2,659,267
ROLL FILM VIEWER
Filed Oct. 7, 1950  5 Sheets-Sheet 5
FIG_6_
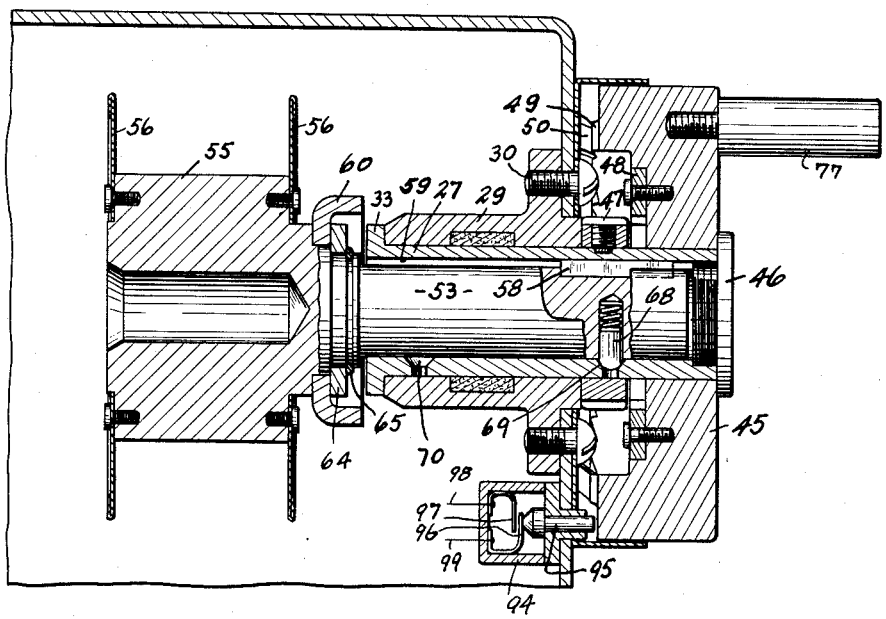
FIG_7_
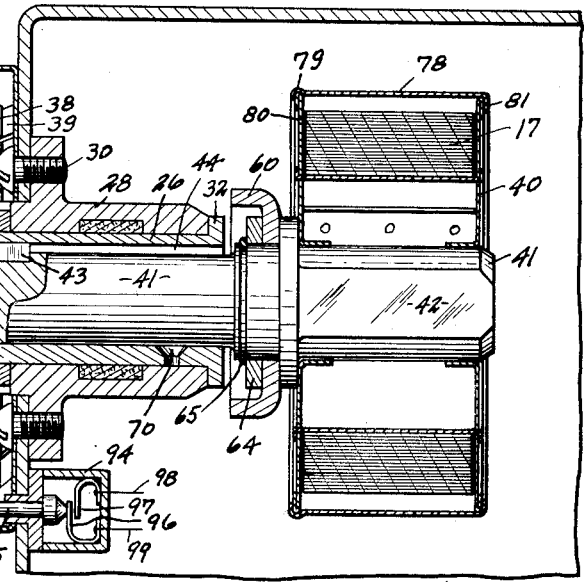
INVENTOR:
Gerhard H. J. Baule,
BY
Buell & Thompson
ATTORNEYS.

Patented Nov. 17, 1953

2,659,267

UNITED STATES PATENT OFFICE 2,659,267

ROLL FILM VIEWER

Gerhard H. J. Baule, Salina, N. Y., assignor to Hall & McChesney Inc., Syracuse, N. Y., a corporation of New York Application October 7, 1950, Serial No. 188,953

2 Claims. (Cl. 88—24)

This invention relates to apparatus for viewing individual images on a roll of film.

The invention has as an object a roll film viewer, or reader, embodying a structure permitting a spool containing the roll of film to be quickly and conveniently mounted in the reader and removed therefrom, the spool being provided with a housing or cover by which the film is adequately protected during handling and storage.

The invention consists in the novel features and in the combinations and constructions hereinafter set forth and claimed.

In describing this invention, reference is had to the accompanying drawings in which like characters designate corresponding parts in all the views.

Figure 1 is a front elevational view of a reader embodying my invention.

Figure 2 is a top plan view of the reader.

Figure 3 is a sectional view taken on line 3—3, Figure 1.

Figure 5 is a view taken on line 5—5, Figure 4.

Figure 6 is a view taken on line 6—6, Figure 4.

Figure 7 is a view taken on line 7—7, Figure 4.

Figure 4:
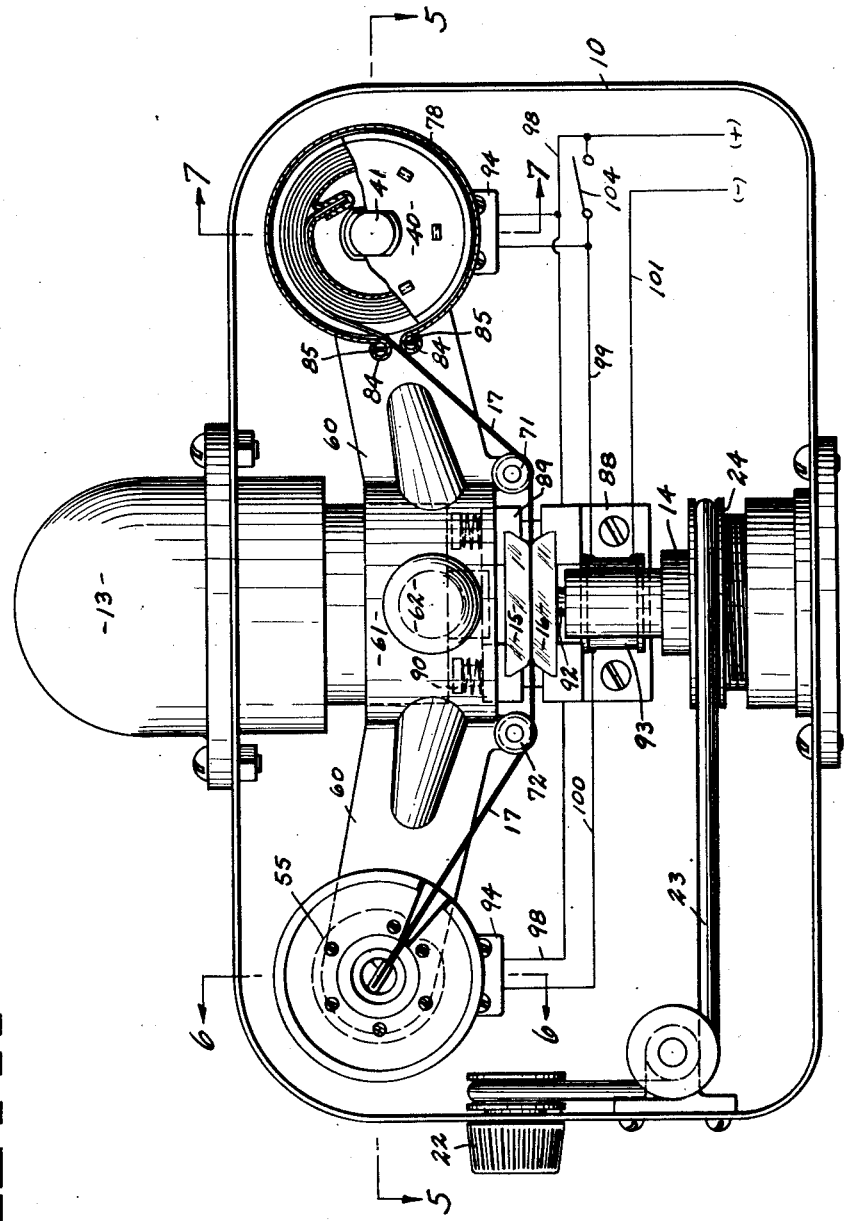
Figure 4 is a rear elevational view.

The reader comprises a cabinet or enclosure support 10 adapted to be mounted in the top 11 of a table structure, the forward portion of the top being inclined and provided with a viewing screen 12. A light source is mounted in a dome-shaped portion 13 mounted on the top wall of the cabinet and adapted to direct a beam through an optical system 14 supported in the bottom wall of the cabinet. A pair of optical flats or transparent plates 15, 16, are mounted intermediate the light source and the optical system 14. The film 17 is positioned between the flats 15, 16, and the light beam is directed upon suitable reflectors 20, 21, whereby a greatly enlarged image is thrown on the viewing screen 12.

The optical system 14 is adjustable to obtain proper focus, this adjustment being obtained by rotation of a knob 22 journalled in the side wall of the cabinet for manipulation externally thereof and being connected through a belt 23 to effect rotation of a pulley 24 forming part of the optical system.

A pair of spool actuating members 26, 27, are journalled in bearing supports 28, 29, fixedly mounted in the front wall of the cabinet, as by screws 30.

The members 26, 27, are in the nature of sleeves or tubular shafts formed on their inner ends with shoulders 32, 33, respectively abutting against the inner ends of the bearing supports 28, 29. A disk 34 is journalled on the outer end of the sleeve 26 and is retained thereon by cap screw 35, see Figure 7. An annular externally splined member or gear having teeth 36 is fixedly secured to the sleeve 26, and an internally splined member 37 is secured to the disk 34 for engagement with the teeth 36 upon inward movement of the disk 34 toward the cabinet. The inner face of the disk is formed with ratchet teeth 38 for engagement with a spring detent 39 whereby rotation of the disk 34 is in the direction of the arrow, see Figure 5. Rotation of the disk 34 in this direction causes the film 17 to be wound upon a spool 40 detachably mounted on the inner end of a shaft 41 formed with a flattened portion 42, or otherwise having driving connection with the spool. The shaft 41 is mounted in the sleeve 26 for axial movement therein and is operatively connected thereto by a key 43 carried by the shaft and slidable in a keyway 44 formed in the bore of the sleeve. A similar disk 45 is journalled on the outer end of the sleeve 27 and retained thereon by a cap screw 46. The disk 45 is operatively connected to the sleeve by similar members 47, 48, having complemental splines engageable upon inward movement of the disk 45. The ratchet teeth 49 and the spring 50 permit rotation of the disk in the direction shown by the arrow, Figure 5. A shaft 53 is slidably mounted in the sleeve 27 and is formed at its inner end with an enlarged portion 55 provided with side flanges 56 forming a second spool on which the film 17 may be wound. The shaft 53 carries a key 58 slidably mounted in a key-way 59 formed in the bore of the sleeve 27.

The shafts 41, 53, are journalled in a bracket 60 formed at its central portion 61 to extend about the lamp housing 13 and having a handle member 62. The shafts 41, 53 are retained against axial movement in the bracket 60 by collars 64 and retaining rings 65, see Figures 6 and 7. Each of the shafts 41, 53, is provided with a spring pressed detent 68 and the sleeves 26, 27, are formed with outer detent receiving recesses 69 and inner recesses 70.

When the bracket 60 and the shafts 41, 53, carried thereby is positioned inwardly, as shown in Figures 5, 6 and 7, the film 17 is in register with the flats 15, 16, and is directed intermediate the flats by rolls 71, 72, carried by the central portion 61 of the bracket, see Figure 4, and in this position the individual frames or images 75 can be successively moved into registration with the optical system. The shafts 41, 53 and the spools 40, 55, are rotated by the disks 34, 45, which are provided with handles 77 for that purpose.

The spool 40 is encircled by a housing 78 formed on the inner side with a bead 79 loosely engaging the peripheral edge of the inner side flange 80 of the spool and serving to detachably hold the housing onto the spool, the outer side of the housing having a radially inwardly extending flange 81 engaging the outer side flange of the spool. The housing 78 is formed with a slot to permit movement of the film 17 through the housing while it is being unwound from and wound upon the spool. As here shown, the housing 78 is formed with spaced apart curved portions 84 forming apertures for the reception of pins 85 carried by the bracket 60. These pins serve to maintain the housing 78 stationary and with the film receiving slot correspondingly positioned to direct the film over the roller 71. The housing 78 serves to cover and protect the film on the film spool during handling and storage of the film.

A spool 40 with the selected film therein is sleeved upon the inner end of the shaft 41 when the bracket 60 is moved outwardly to the dotted line position shown at 87, Figure 5. A portion of the film is unwound from the spool, placed over rollers 71, 72, and the free end attached to the spool 55. During this procedure, the detents 68 are positioned in the recess 70. The bracket is then moved inwardly to position the detents 68 in the recesses 69. The disk 45 is then pressed inwardly and rotated to wind the film on the spool 55 until the desired image 75 is moved into registration with the optical system. The optical flat 16 is fixedly mounted upon a supporting bracket 88 mounted in the cabinet. The upper flat 15 is carried by a plate 89 slidably mounted on studs 90 carried by the bracket 88. The plate 89 is pressed downwardly by compression springs 91 mounted on the stud, and a plunger 92 depends from the plate 89 into solenoid 93. When the solenoid 93 is energized, the plate 89 is moved upwardly to separate the flats 15, 16.

A switch 94 is mounted in the cabinet in juxtaposition to each of the disks 34, 45. A plunger 95 is slidably mounted in the cabinet and is moved inwardly by the disks 34, 45, respectively, moving contact 96 into engagement with contact 97, these contacts remaining closed during rotation of either of the shafts 41, 53. The contacts 97 of the switch 94 are connected to a feed wire 98, and the contacts 96 are connected to the solenoid 93 by wires 99, 100. The opposite side of the solenoid is connected to the wire 101.

With this arrangement, when either of the disks 34, 45, are moved inwardly to effect rotation of the spools 40, 55, the solenoid 93 is energized, effecting the separation of the flats 15, 16, to permit free movement of the film 17 therebetween. Upon release of the actuating disk, the same is moved outwardly by the springs 39, 50, opening the contacts of the switch 94, deenergizing the solenoid and permitting the upper flat 15 to move toward the flat 16 by springs 91 maintaining the film in flat condition to avoid distortion. A switch 104 is accessible from the rear of the cabinet to energize the solenoid 93 to permit convenient removal of the film from between the flats when it is desired to substitute another spool 40 containing a different film.

What I claim is:

1. In a roll film reader, a support, a pair of spaced film spools having shafts rotatably carried by one of the walls of said support, axially movable actuating means for each of said spools, gear means for drivingly interconnecting the actuating means with the spool shafts, means resiliently retaining the gear means out of operative connection except when said actuating means is axially moved in opposition to the resilient means for winding, a pair of optical flats within said support and between which the film is adapted to be positioned, one of said flats being stationary relative to the support and the other flat being movable relative to the support, and automatic means actuated upon axial movement of said actuating means in opposition to the resilient means to a position for driving a spool for moving said other optical flat away from the one flat whereby the film can be freely moved between the flats.

2. In a roll film reader, a support, a pair of spaced film spools having shafts rotatably carried by one of the walls of said support, axially movable actuating means for each of said spools, gear means for drivingly interconnecting the actuating means with the spool shafts, means resiliently retaining the gear means out of operative connection except when said actuating means is axially moved in opposition to the resilient means for winding, a pair of optical flats within said support and between which the film is adapted to be positioned, one of said flats being stationary relative to the support and the other flat being movable relative to the support, and automatic means actuated upon axial movement of said actuating means in opposition to the resilient means to a position for driving a spool for moving said other optical flat away from the one flat whereby the film can be freely moved between the flats, said automatic means including a switch closed when the actuating means is in its axially moved operative position and open when the actuating means is in its resiliently retracted inoperative position, said switch being in electrical connection with a solenoid and the solenoid being in operative connection with said other of the optical flats for moving the latter relative to the one flat when the switch is closed.

GERHARD H. J. BAULE.

References Cited in the file of this patent

UNITED STATES PATENTS

| Number | Name | Date |
| --- | --- | --- |
| 2,163,593 | Draeger | June 27, 1939 |
| 2,280,750 | Emerson | Apr. 21, 1942 |
| 2,324,086 | Hutchison | July 13, 1943 |
| 2,464,673 | Debrie | Mar. 15, 1949 |
| 2,473,736 | Stein | June 21, 1949 |